(12) United States Patent
Wang et al.

(10) Patent No.: US 12,328,534 B2
(45) Date of Patent: Jun. 10, 2025

(54) DISPLAY APPARATUS AND METHOD, AND VEHICLE

(71) Applicant: Huawei Technologies Co., Ltd., Shenzhen (CN)

(72) Inventors: Jinlei Wang, Dongguan (CN); Yunfei Yan, Dongguan (CN); Zhiyong Feng, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 173 days.

(21) Appl. No.: 17/986,328

(22) Filed: Nov. 14, 2022

(65) Prior Publication Data

US 2023/0073589 A1   Mar. 9, 2023

Related U.S. Application Data

(63) Continuation of application No. PCT/CN2020/140157, filed on Dec. 28, 2020.

(30) Foreign Application Priority Data

May 15, 2020   (CN) .......................... 202010414117.X (51) Int. Cl.
*G02B 27/01* (2006.01)
*B60K 35/00* (2024.01)
(Continued)

(52) U.S. Cl.
CPC ............ *H04N 9/3147* (2013.01); *B60K 35/00* (2013.01); *G02B 5/0263* (2013.01); *G02B 5/0278* (2013.01); *G02B 27/0101* (2013.01); *H04N 9/3152* (2013.01); *B60K 35/23* (2024.01); *B60K 2360/27* (2024.01)

(58) Field of Classification Search
CPC ........ G02B 27/0101; G02B 2027/0185; B60K 35/213; B60K 2360/177; B60K 2360/31; B60K 35/23; B60K 35/00
See application file for complete search history.

(56) References Cited

U.S. PATENT DOCUMENTS

2006/0103932 A1   5/2006   Relke et al.
2008/0074565 A1   3/2008   Sagawa
(Continued)

FOREIGN PATENT DOCUMENTS

CN   101464562 A   6/2009
CN   101998090 A   3/2011
(Continued)

*Primary Examiner* — Ryan D Howard
(74) *Attorney, Agent, or Firm* — Conley Rose, P.C.

(57) ABSTRACT

A display apparatus includes an image generator including a spatial light modulator that is configured to perform phase modulation on to-be-modulated image light to generate modulated first image light and modulated second image light, and an image display module that is disposed on a light emitting side of the image generator. The image display module includes a first diffusing screen and a second diffusing screen. The first image light is projected on the first diffusing screen and the second image light is projected on the second diffusing screen. A spatial position of the first diffusing screen is different from a spatial position of the second diffusing screen.

20 Claims, 4 Drawing Sheets

(51) Int. Cl.
*G02B 5/02* (2006.01)
*H04N 9/31* (2006.01)
*B60K 35/23* (2024.01)

(56) References Cited

U.S. PATENT DOCUMENTS

| | | |
|---|---|---|
| 2009/0160736 A1 | 6/2009 | Shikita |
| 2013/0265646 A1 | 10/2013 | Sakai |
| 2017/0082855 A1 | 3/2017 | Christmas |
| 2017/0127025 A1 | 5/2017 | Damberg et al. |
| 2017/0132970 A1 | 5/2017 | Tang |
| 2017/0235138 A1 | 8/2017 | Morohashi et al. |
| 2018/0314065 A1 | 11/2018 | Li |
| 2018/0328564 A1 | 11/2018 | Albou et al. |
| 2019/0086661 A1 | 3/2019 | Misawa et al. |
| 2019/0250403 A1 | 8/2019 | Gache et al. |
| 2019/0317326 A1* | 10/2019 | Meijering ............ H04N 13/344 |
| 2020/0064640 A1 | 2/2020 | Nagano et al. |
| 2020/0393675 A1 | 12/2020 | Huang |
| 2021/0003839 A1 | 1/2021 | Huang |
| 2021/0199963 A1 | 7/2021 | Li |

FOREIGN PATENT DOCUMENTS

| | | |
|---|---|---|
| CN | 105280111 A | 1/2016 |
| CN | 105339701 A | 2/2016 |
| CN | 105785570 A | 7/2016 |
| CN | 205720984 U | 11/2016 |
| CN | 106371222 A | 2/2017 |
| CN | 106483664 A | 3/2017 |
| CN | 106796355 A | 5/2017 |
| CN | 106896506 A | 6/2017 |
| CN | 108139583 A | 6/2018 |
| CN | 108870307 A | 11/2018 |
| CN | 109031676 A | 12/2018 |
| CN | 110031977 A | 7/2019 |
| CN | 110221430 A | 9/2019 |
| CN | 110275295 A | 9/2019 |
| CN | 209381917 U | 9/2019 |
| CN | 110554497 A | 12/2019 |
| CN | 110573930 A | 12/2019 |
| GB | 2526275 A | 11/2015 |
| GB | 2552851 A | 2/2018 |
| JP | 2013214008 A | 10/2013 |
| JP | 2015087512 A | 5/2015 |
| JP | 2016045252 A | 4/2016 |
| JP | 2017077791 A | 4/2017 |
| JP | 2017518539 A | 7/2017 |
| JP | 2018092085 A | 6/2018 |
| WO | 2017061019 A1 | 4/2017 |
| WO | 2017134866 A1 | 8/2017 |
| WO | 2018160765 A1 | 9/2018 |
| WO | 2019174447 A1 | 9/2019 |

* cited by examiner

| Perform phase modulation on to-be-modulated image light, to generate modulated first image light and modulated second image light | ⎯ S101 |
|---|---|
| Project the modulated first image light onto a first diffusing screen, and project the modulated second image light onto a second diffusing screen | ⎯ S102 |

DISPLAY APPARATUS AND METHOD, AND VEHICLE

CROSS-REFERENCE TO RELATED APPLICATIONS

This application is continuation of International Patent Application No. PCT/CN2020/140157, filed on Dec. 28, 2020, which claims priority to Chinese Patent Application No. 202010414117.X, filed on May 15, 2020. The disclosures of the aforementioned applications are hereby incorporated by reference in their entireties.

TECHNICAL FIELD

Embodiments of the present disclosure relate to the field of heads-up display, and in particular, to a display apparatus and method, and a vehicle.

BACKGROUND

During vehicle driving, a driver's lowering the head to watch a dashboard or other consumer electronics may affect observation of a road condition and may further cause a security risk.

A heads-up display (HUD), referred to as a windshield meter display or a heads-up display system, can map important information to a holographic half mirror on a windshield, so that the driver can clearly view the important information without lowering the head.

However, with development of HUDs, more functions are attached to the HUDs. For example, the HUD further includes long-distance augmented reality (AR) road prompt information. These new HUDs require a plurality of virtual image planes.

Figure 1:
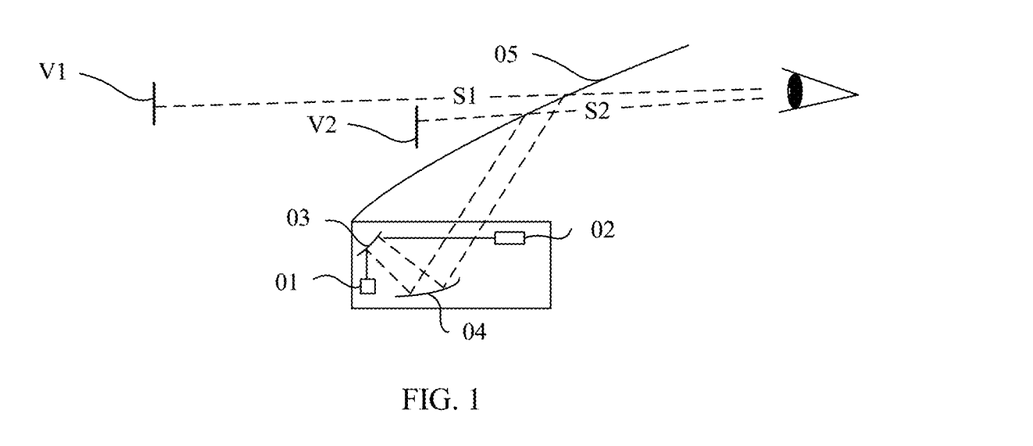
FIG. 1 is a schematic diagram of a structure of a display apparatus.

FIG. 1 is a schematic diagram of an HUD with a plurality of virtual image planes. The HUD has a virtual image V1 that is at a first distance S1 away from a driver and a virtual image V2 that is at a second distance S2 away from the driver. In the conventional technology, to implement the HUD with a plurality of virtual image planes, the following method is mainly used.

For example, as shown in FIG. 1, two image generation modules are disposed, which are respectively a first image generation module 01 and a second image generation module 02. The first image generation module 01 and the second image generation module 02 respectively generate short-distance meter information and long-distance AR-based road prompt information. After respectively passing through reflective optical elements 03 and 04, images generated by 01 and 02 pass through a front windshield 05 of a vehicle, to respectively form a virtual image V1 and a virtual image V2, to simultaneously display images with two distances. However, in the conventional technology, to generate a plurality of virtual images with different distances, a plurality of image sources need to be used. This increases system costs and is not conducive to system miniaturization.

SUMMARY

Embodiments of the present disclosure provide a display apparatus and method, and a vehicle, to resolve problems of high costs and a large size of a heads-up display system.

To achieve the foregoing objective, the present disclosure adopts the following technical solutions. According to a first aspect of the embodiments of the present disclosure, a display apparatus is provided including an image generation module including a spatial light modulator that is configured to perform phase modulation on to-be-modulated image light, to generate modulated first image light and modulated second image light; and an image display module that is disposed on a light emitting side of the image generation module. The image display module includes a first diffusing screen and a second diffusing screen. The first image light is projected onto the first diffusing screen, and the second image light is projected onto the second diffusing screen. A spatial position of the first diffusing screen is different from a spatial position of the second diffusing screen. In this way, the spatial light modulator is disposed in the image generation module, and a plurality of images with different spatial positions may be generated on the diffusing screens, so that different types of information can be displayed on different images, to meet a plurality of display requirements. Compared with a manner of disposing a plurality of image generation modules to form images in different positions in space, this can save space, and is conducive to device miniaturization.

In an optional implementation, the image generation module further includes a light source and an image panel. The image panel is located between a light emitting surface of the light source and an incident surface of the spatial light modulator. The image panel includes a first display area and a second display area. A light beam emitted from the light source passes through the image panel to generate the to-be-modulated image light based on an area. In this way, the image panel may be disposed to preliminarily image, based on an area, the light beam emitted from the light source, to obtain the to-be-modulated image light.

In an optional implementation, the incident surface of the spatial light modulator includes a first area opposite to the first display area and a second area opposite to the second display area. Image light emitted from the first display area is incident onto the first area, and image light emitted from the second display area is incident onto the second area. In this way, the spatial light modulator is divided into a plurality of areas, so that the spatial light modulator can modulate image light based on an area.

In an optional implementation, the spatial light modulator includes a first phase modulation unit and a second phase modulation unit. The first phase modulation unit is configured to load first phase information into image light in the first area, and the second phase modulation unit is configured to load second phase information into image light in the second area, to perform phase modulation on the image light in the first area and the second area based on an area. In this way, a plurality of phase modulation units are disposed in the spatial light modulator to load different phase information into image light in different areas, so that image light emitted from different areas of the spatial light modulator generates different focal lengths, and the image light emitted from different areas of the spatial light modulator has different imaging positions in space, thereby avoiding overlapping and mutual interference between at least two projected images that are finally obtained.

In an optional implementation, the spatial light modulator includes a first grating modulation unit corresponding to the first area and a second grating modulation unit corresponding to the second area. A grating structure of the first grating modulation unit is different from a grating structure of the second grating modulation unit, to perform phase modulation on the image light in the first area and the second area based on an area. In this way, a plurality of grating modulation units are disposed in the spatial light modulator, and image light in different areas corresponds to different grating structures, so that image light emitted from different areas of the spatial light modulator has different light deflection angles, and the image light emitted from different areas of the spatial light modulator has different imaging positions in space, thereby further avoiding overlapping and mutual interference between at least two projected images that are finally obtained.

In an optional implementation, the image generation module further includes an imaging element. The imaging element is disposed on a light emitting side of the spatial light modulator, and is configured to perform image reproduction on the first image light and the second image light that are emitted after being modulated by the spatial light modulator, project the first image light onto the first diffusing screen, and project the second image light onto the second diffusing screen. The imaging element may be a Fourier lens. The first diffusing screen and the second diffusing screen are disposed on an image plane of the Fourier lens. In this way, a clear image may be generated on the first diffusing screen and the second diffusing screen.

In an optional implementation, the image display module further includes an optical control module. The optical control module is configured to control transmission areas and white areas of the first diffusing screen and the second diffusing screen. The first diffusing screen and the second diffusing screen each include, for example, a dimming film. The dimming film is white when not being energized, and is colorless and transparent when being energized. The diffusing screen in a white state may be used for projection, and, the diffusing screen in a transparent state may be pervious to light. The optical control module may control energized areas of the first diffusing screen and the second diffusing screen, so that the first diffusing screen and the second diffusing screen are in a white or transparent state. In this way, the optical control module may control the transmission areas and the white areas of the first diffusing screen and the second diffusing screen, so that the first image light and the second image light can be respectively projected onto the first diffusing screen and the second diffusing screen.

In an optional implementation, the first diffusing screen and the second diffusing screen are stacked, so that the first image light is projected onto the white area of the first diffusing screen, and the second image light is projected onto the white area of the second diffusing screen after passing through the transmission area of the first diffusing screen. In this way, the first diffusing screen and the second diffusing screen are stacked, which saves more space and is conducive to device miniaturization.

In an optional implementation, the display apparatus further includes a lens group. The lens group is configured to guide the first image light and the second image light to a projection area, to form a first projected image and a second projected image with different spatial positions. In this way, the lens group may be disposed to adjust optical paths of the first image light and the second image light.

In an optional implementation, the first image light is reflected to the projection area through a first optical path, and the second image light is reflected to the projection area through a second optical path. A length of the first optical path is different from a length of the second optical path. In this way, the lengths of the optical paths of the first image light and the second image light may be adjusted to change imaging positions in space that are of the first image light and the second image light, thereby avoiding overlapping and mutual interference between finally obtained projected images.

According to a second aspect of the embodiments of the present disclosure, an image display method is provided. The image display method includes performing phase modulation on to-be-modulated image light, to generate modulated first image light and modulated second image light; and projecting the first image light onto a first diffusing screen, and projecting the second image light onto a second diffusing screen, where a spatial position of the first diffusing screen is different from a spatial position of the second diffusing screen.

In an optional implementation, the projecting the first image light onto a first diffusing screen, and projecting the second image light onto a second diffusing screen includes controlling transmission areas and white areas of the first diffusing screen and the second diffusing screen, so that the first image light is projected onto the white area of the first diffusing screen, and the second image light is projected onto the white area of the second diffusing screen after passing through the transmission area of the first diffusing screen, where the first diffusing screen and the second diffusing screen are stacked.

In an optional implementation, the performing phase modulation on to-be-modulated image light includes loading different phase information into the to-be-modulated image light based on an area, or loading gratings with different structures into the to-be-modulated image light based on an area.

In an optional implementation, before the projecting the first image light onto a first diffusing screen, and projecting the second image light onto a second diffusing screen, the method further includes performing image reproduction on the first image light and the second image light.

In an optional implementation, the method further includes guiding the first image light and the second image light to a projection area, to form a first projected image and a second projected image with different spatial positions. A lens group may guide the modulated first image light and the modulated second image light to the projection area. For example, the first image light is guided to the projection area through a first optical path, and the second image light is guided to the projection area through a second optical path. A length of the first optical path may be different from a length of the second optical path. In this way, the lengths of the optical paths of the first image light and the second image light may be adjusted to further change imaging positions in space that are of the first image light and the second image light, thereby avoiding overlapping and mutual interference between finally obtained projected images.

According to a second aspect of the embodiments of the present disclosure, a vehicle is provided. The vehicle includes a vehicle body, a windshield disposed on the vehicle body, and the foregoing display apparatus. A light beam emitted from the display apparatus is incident onto a front windshield of the vehicle to form a first projected image and a second projected image. In this way, the foregoing display apparatus may be disposed to map important information to space in front of the windshield, so that a driver can clearly view the important information without having to lower the head, thereby improving safety performance of the vehicle.

In an optional implementation, the first projected image is used to display vehicle status information of the vehicle, and the second projected image is used to display road condition indication information. In this way, a plurality of different types of information may be displayed in space.

The display apparatus provided in the embodiments of the present disclosure includes the light source, the image panel, the spatial light modulator, the imaging element, and at least two diffusing screens with different spatial positions. Light emitted from the light source is projected onto the image panel, and at least two beams of to-be-modulated image light are generated based on an area. The incident surface of the spatial light modulator is divided into at least two areas. The spatial light modulator is configured to perform phase modulation on the at least two beams of to-be-modulated image light based on an area, to generate at least two beams of modulated image light. Image light in different areas in space has different phase information. The imaging element is configured to perform image reproduction on the at least two beams of modulated image light, to generate a plurality of images with different spatial positions on the diffusing screens. Therefore, different types of information can be displayed on different images, to meet a plurality of display requirements.

DESCRIPTION OF EMBODIMENTS

To make the objectives, technical solutions, and advantages of the present disclosure clearer, the following further describes the present disclosure in detail with reference to the accompanying drawings.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the present disclosure, unless otherwise specified, "a plurality of" means two or more than two.

In addition, in the present disclosure, directional terms such as "top" and "bottom" are defined relative to example locations of parts shown in the accompanying drawings. It should be understood that these directional terms are relative concepts and are used for relative description and clarification, and may correspondingly change based on a change in the locations of the parts shown in the accompanying drawings.

Figure 2:
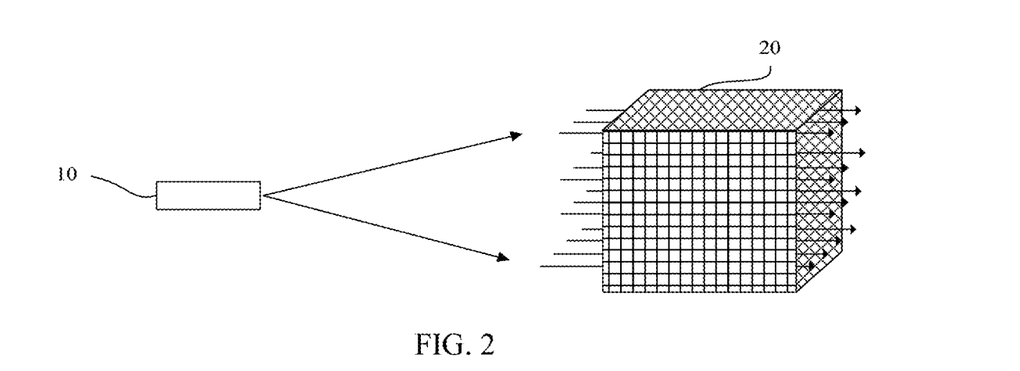
FIG. 2 is a schematic diagram of a structure of a display apparatus according to an embodiment of the present disclosure.

An embodiment of the present disclosure provides a display apparatus. As shown in FIG. 2, the display apparatus includes an image generation module 10 and an image display module 20. The image display module 20 is located on a light emitting side of the image generation module 10, to display image light emitted from the image generation module 10.

Figure 3A:
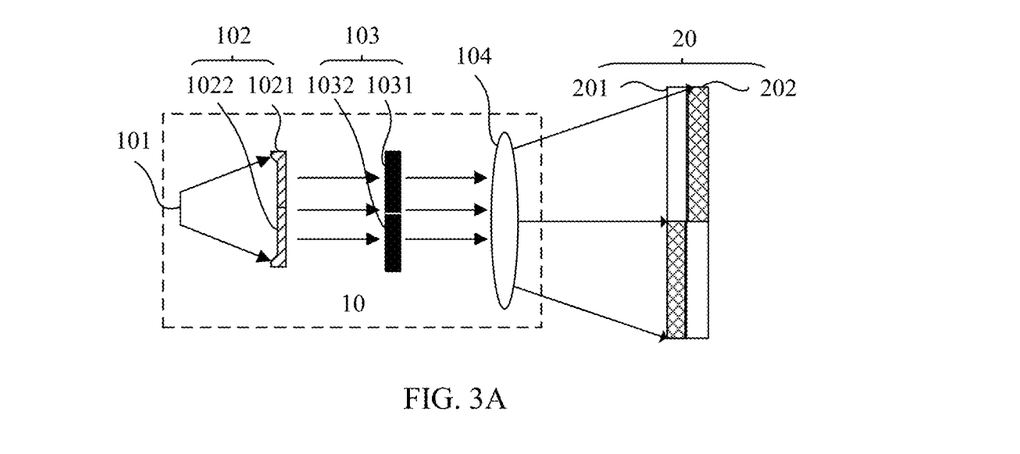
FIG. 3A is a schematic diagram of a structure of another display apparatus according to an embodiment of the present disclosure.

As shown in FIG. 3A, the image generation module 10 includes a spatial light modulator 103 that is configured to perform phase modulation on to-be-modulated image light, to generate modulated first image light and modulated second image light.

The spatial light modulator 103 may modulate a parameter of a light field by using a liquid crystal molecule. For example, a refractive index of the liquid crystal molecule may be changed to modulate a phase of an optical wave, to delay distribution of different phases, thereby performing phase modulation on incident light.

For example, the spatial light modulator 103 may be a phase-only spatial light modulator 103. The phase-only spatial light modulator 103 modulates only a phase of an incident light beam, so that a modulation effect is good. In some other embodiments of the present disclosure, the spatial light modulator 103 may alternatively be a phase-amplitude composite spatial light modulator 103, and the phase-amplitude composite spatial light modulator 103 modulates both a phase and an amplitude of an incident light beam.

The image display module 20 includes a first diffusing screen 201 and a second diffusing screen 202. The first image light is projected onto the first diffusing screen 201, and the second image light is projected onto the second diffusing screen 202. A spatial position of the first diffusing screen 201 is different from a spatial position of the second diffusing screen 202.

In this way, in the present disclosure, the spatial light modulator is disposed in the image generation module, and a plurality of images with different spatial positions may be generated on the diffusing screens, so that different types of information can be displayed on different images, to meet a plurality of display requirements. Compared with the conventional technology in which a plurality of image generation modules are disposed, this can save space and is conducive to device miniaturization.

The image generation module 10 further includes a light source 101 and an image panel 102. The light source 101 is configured to emit a to-be-modulated light beam. The image panel 102 is located between a light emitting surface of the light source 101 and an incident surface of the spatial light modulator 103.

The light source 101 in this embodiment of the present disclosure may be an light-emitting diode (LED) light source, or may be a laser light source.

The image panel 102 includes but is not limited to a liquid crystal display module, a digital light processing module, and a laser display module.

As shown in FIG. 2, the image panel 102 includes a first display area 1021 and a second display area 1022. The first display area 1021 and the second display area 1022 respectively generate to-be-modulated first image light and to-be-modulated second image light.

In another embodiment of the present disclosure, the image panel 102 further includes a third display area configured to generate third image light. By analogy, the image panel 102 may include two or more display areas, to generate two or more beams of image light.

In the present disclosure, the image panel 102 is segmented for use, to form a plurality of display areas that are logically independently applied but physically integrated. A segmentation method of the image panel 102 is not limited to rectangular segmentation, and may be segmentation of any geometric shape.

In this way, the image panel may be disposed to preliminarily image, based on an area, the light beam emitted from the light source, to obtain the to-be-modulated image light. The display apparatus in this embodiment of the present disclosure can form at least two projected images with different spatial positions, so that different types of information can be displayed on different projected images, to meet a plurality of display requirements.

The to-be-modulated image light emitted from the light source 101 is incident onto the spatial light modulator 103 based on time or an area by using the image panel 102. The spatial light modulator 103 is configured to perform phase modulation on the to-be-modulated image light based on time or an area, to obtain the modulated first image light and the modulated second image light.

In this embodiment of the present disclosure, the spatial light modulator 103 may perform phase modulation on a to-be-modulated incident light beam in a plurality of manners, to obtain at least two phase-modulated light beams with different light emitting directions. Descriptions are provided below by using an example.

In some embodiments of the present disclosure, the incident surface of the spatial light modulator 103 may be divided into at least two areas, for example, a first area 1031 opposite to the first display area 1021 of the image panel 102 and a second area 1032 opposite to the second display area 1022 of the image panel 102.

In another implementation of the present disclosure, for example, the incident surface of the spatial light modulator 103 may further include a third area opposite to the third display area of the image panel 102. By analogy, the incident surface of the spatial light modulator 103 may include two or more areas to modulate image light in the areas based on an area.

In this way, the spatial light modulator is divided into a plurality of areas, so that the spatial light modulator can modulate image light based on an area.

For example, the incident surface of the spatial light modulator 103 includes the first area 1031 and the second area 1032. The spatial light modulator 103 further includes at least two phase modulation units, for example, a first phase modulation unit corresponding to the first area 1031 and a second phase modulation unit corresponding to the second area 1032.

For example, the first phase modulation unit may load first phase information into image light incident onto the first area 1031, and the second phase modulation unit may load second phase information into image light incident onto the second area 1032, so that light beams emitted from different areas of the spatial light modulator 103 generate different focal lengths, and the first image light and the second image light have different imaging positions in space, thereby avoiding overlapping and mutual interference between at least two projected images that are finally obtained.

The spatial light modulator 103 further includes at least two grating modulation units, for example, a first grating modulation unit corresponding to the first area 1031 and a second grating modulation unit corresponding to the second area 1032.

The first grating modulation unit and the second grating modulation unit may deflect an emitted light beam by a specific angle. A grating structure of the first grating modulation unit is different from a grating structure of the second grating modulation unit, so that a deflection angle of a light beam emitted from the first area 1031 may be different from a deflection angle of a light beam emitted from the second area 1032, thereby avoiding overlapping and mutual interference between at least two projected images that are finally obtained.

It should be noted that, the segmentation method for the first display area 1021 and the second display area 1022 of the image display panel is not limited in this embodiment of the present disclosure, and may be segmentation in a regular shape such as a rectangle or a triangle or in any irregular geometric shape. In addition, to adjust space of a system structure, the image panel 102 may have some unused areas.

Figure 4:
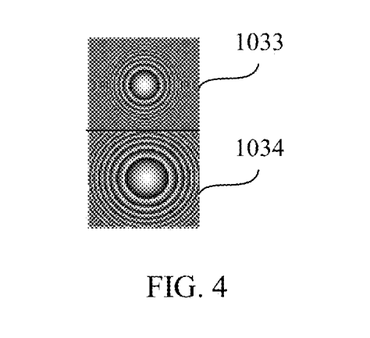
FIG. 4 is a schematic diagram of phase information loaded by a first phase modulation unit and a second modulation unit according to an embodiment of the present disclosure.

In an implementation of the present disclosure, the spatial light modulator includes the first phase modulation unit and the second modulation unit. The incident surface of the spatial light modulator is divided into two areas. The first area 1031 is corresponding to the first phase modulation unit, and the second area 1032 is corresponding to the second phase modulation unit. FIG. 4 is a schematic diagram of phase information loaded by a first phase modulation unit and a second modulation unit according to an embodiment of the present disclosure. As shown in FIG. 4, a focal length of a first phase pattern 1033 loaded by the first phase modulation unit is different from a focal length of a second phase pattern 1034 loaded by the second modulation unit, so that light beams emitted from different areas of the spatial light modulator generate different focal lengths.

In some other embodiments of the present disclosure, the spatial light modulator 103 may include a third phase modulation unit configured to load composite kinoforms of different target images based on time, to implement phase modulation on the to-be-modulated light beam. A phase modulation unit may implement focusing or divergence of a light beam. When phase information loaded at different moments is different, focal lengths of light beams emitted at different moments may be different, to implement dynamic zooming.

In some other embodiments of the present disclosure, the spatial light modulator 103 may include a third grating modulation unit configured to perform phase modulation on the to-be-modulated image light based on time, to deflect an emitted light beam by a specific angle. When grating structures loaded at different moments are different, deflection angles of light beams emitted at different moments may be different.

In some embodiments of the present disclosure, the display apparatus may further include a processor, connected to the spatial light modulator 103 and configured to superimpose and compound phase information of the to-be-modulated first image and the to-be-modulated second image and phase information loaded by the phase modulation unit, to generate the modulated first image and the modulated second image, or superimpose and compound the phase information of the to-be-modulated first image and the to-be-modulated second image and grating information of the grating modulation unit, to generate the modulated first image and the modulated second image. The processor may be a general-purpose central processing unit (CPU), a microprocessor, an application-specific integrated circuit (ASIC), or one or more integrated circuits configured to control program execution of the solution of the present disclosure.

In the foregoing embodiment, the processor may perform processing to obtain the modulated first image and the modulated second image. In some other embodiments of the present disclosure, the spatial light modulator 103 may generate the modulated first image and the modulated second image.

In this embodiment of the present disclosure, the spatial light modulator 103 is used to implement at least two projections with different spatial positions. This implementation has a simple structure and relatively low costs.

In some preferred embodiments of the present disclosure, the image generation module 10 further includes an imaging element 104. The imaging element 104 is disposed on a light emitting side of the spatial light modulator 103, performs image reproduction on the first image light and the second image light that are emitted after being modulated by the spatial light modulator 103, projects the first image light onto the first diffusing screen 201, and projects the second image light onto the second diffusing screen 202.

For example, the imaging element 104 may be a Fourier lens. In this case, the first diffusing screen 201 and the second diffusing screen 202 are disposed on an imaging surface of the Fourier lens. Specific positions of the first diffusing screen 201 and the second diffusing screen 202 depend on a focal length of corresponding phase information and grating information. Certainly, in some other embodiments of the present disclosure, the imaging element 104 may alternatively be another type of optical element.

Materials of the first diffusing screen 201 and the second diffusing screen 202 are not limited in this embodiment of the present disclosure. For example, the first diffusing screen 201 and the second diffusing screen 202 each include a dimming film. The dimming film is white when not being energized, and is colorless and transparent when being energized.

The image display module 20 further includes an optical control module. The optical control module is configured to energize the first diffusing screen 201 and the second diffusing screen 202, so that energized areas of the first diffusing screen 201 and the second diffusing screen 202 are colorless and transparent, and areas that are not energized in the first diffusing screen 201 and the second diffusing screen 202 are white. In this way, image light may pass through the transparent area to be projected onto the white areas of the first diffusing screen 201 and the second diffusing screen 202.

In the foregoing embodiment, the phase modulation unit may implement focusing or divergence of a light beam. When phase information loaded by the spatial light modulator 103 is different, focal lengths of light beams emitted from the spatial light modulator 103 may be different. Therefore, at least two projected images that are finally formed have different distances in an axial direction, where the axial direction may be a direction perpendicular to the imaging element 104. In addition, the first diffusing screen 201 and the second diffusing screen 202 have different distances in an axial direction, so that an image can be clearly formed on the first diffusing screen 201 and the second diffusing screen 202.

In an implementation of the present disclosure, the first diffusing screen 201 and the second diffusing screen 202 are stacked in the axial direction. The optical control module may energize only some areas of the first diffusing screen 201 and the second diffusing screen 202, to control transmission areas and white areas the first diffusing screen 201 and the second diffusing screen 202, so that some areas of the first diffusing screen 201 and the second diffusing screen 202 are white and some areas of the first diffusing screen 201 and the second diffusing screen 202 are in a transparent state.

It should be noted that the axial direction may be a direction perpendicular to the imaging element 104.

For example, a distance between the first diffusing screen 201 and the imaging element 104 is less than a distance between the second diffusing screen 202 and the imaging element 104. For example, the first image light may be projected onto the white area of the first diffusing screen 201, and the second image light may be projected onto the white area of the second diffusing screen 202 after passing through the transmission area of the first diffusing screen 201.

In this way, the first diffusing screen and the second diffusing screen are stacked, which saves more space and is conducive to device miniaturization.

Figure 3B:
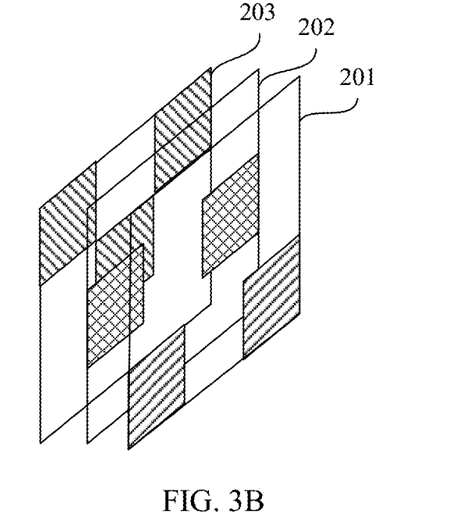
FIG. 3B is a schematic diagram of a display status of a diffusing screen according to an embodiment of the present disclosure.
Figure 3C:
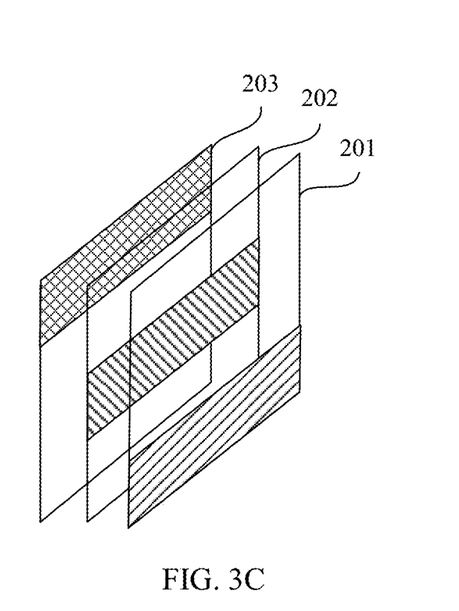
FIG. 3C is a schematic diagram of a display status of another diffusing screen according to an embodiment of the present disclosure.

In another embodiment of the present disclosure, as shown in FIG. 3B and FIG. 3C, the image display module further includes a third diffusing screen 203. For example, the third diffusing screen 203 is configured to display third image light. FIG. 3B and FIG. 3C are diagrams in which a display picture is displayed based on different display positions and distances of parts of the display picture.

In FIG. 3B, for example, an image formed by the image generation module may be segmented into an array structure of 3×3. The first diffusing screen 201, the second diffusing screen 202, and the third diffusing screen 203 may be segmented into corresponding nine parts by using the optical control module, so that some areas of the first diffusing screen 201, the second diffusing screen 202, and the third diffusing screen 203 are in a white state, and some areas of the first diffusing screen 201, the second diffusing screen 202, and the third diffusing screen 203 are in a transparent state. In addition, white parts of the first diffusing screen 201, the second diffusing screen 202, and the third diffusing screen 203 are disposed in a staggered manner.

During operation, the first image light may be projected onto the white area of the first diffusing screen 201, the second image light may be projected onto the white area of the second diffusing screen 202 after passing through a transmission area of the first diffusing screen 201, and the third image light may be projected onto the white area of the third diffusing screen 203 after passing through transmission areas of the first diffusing screen 201 and the second diffusing screen 202. In this way, images displayed on the diffusing screens have both different axial distances and different spatial positions, thereby avoiding overlapping and mutual interference between finally obtained projected images.

In FIG. 3C, for example, an image formed by the image generation module may be segmented into an array structure of three rows. The first diffusing screen 201, the second diffusing screen 202, and the third diffusing screen 203 may be segmented into corresponding three parts by using the optical control module, so that some areas of the first diffusing screen 201, the second diffusing screen 202, and the third diffusing screen 203 are in a white state, and some areas of the first diffusing screen 201, the second diffusing screen 202, and the third diffusing screen 203 are in a transparent state. In addition, white parts of the first diffusing screen 201, the second diffusing screen 202, and the third diffusing screen 203 are disposed in a staggered manner.

During operation, the first image light may be projected onto the white area of the first diffusing screen 201, the second image light may be projected onto the white area of the second diffusing screen 202 after passing through a transmission area of the first diffusing screen 201, and the third image light may be projected onto the white area of the third diffusing screen 203 after passing through transmission areas of the first diffusing screen 201 and the second diffusing screen 202. In this way, images displayed on the diffusing screens have both different axial distances and different spatial positions, thereby avoiding overlapping and mutual interference between finally obtained projected images.

It should be noted that, in the foregoing embodiment, only an example in which an image display module includes two or three diffusing screens is used for description. In another implementation of the present disclosure, the image module may include N diffusing screens. For example, each diffusing screen may be segmented into an array structure of N×M, where both M and N are positive integers greater than 1, so that N images with different spatial positions can be displayed, which all fall within the protection scope of the present disclosure.

In another implementation of the present disclosure, the display apparatus further includes, for example, a lens group. The lens group is configured to guide the first image light and the second image light to a projection area, to form a first projected image and a second projected image with different spatial positions. In this way, the lens group may be disposed to adjust optical paths of the first image light and the second image light.

For example, the first image light is reflected to the projection area through a first optical path, and the second image light is reflected to the projection area through a second optical path. A length of the first optical path is different from a length of the second optical path. In this way, the lengths of the optical paths of the first image light and the second image light may be adjusted to change imaging positions in space that are of the first image light and the second image light, thereby avoiding overlapping and mutual interference between finally obtained projected images.

In this embodiment of the present disclosure, the lens group may be a plurality of types of optical components. Descriptions are provided below by using an example.

Figure 5:
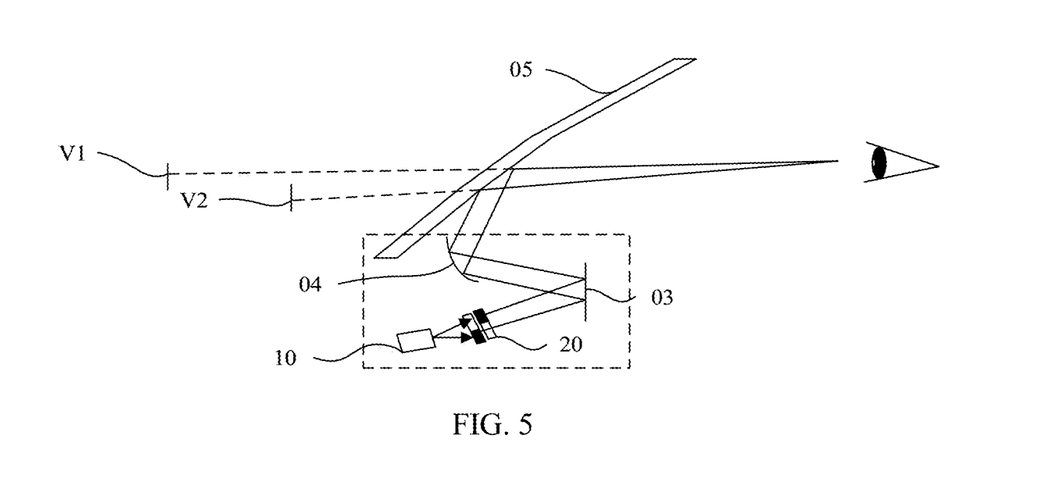
FIG. 5 is a schematic diagram of a structure of another display apparatus according to an embodiment of the present disclosure.

In some embodiments of the present disclosure, as shown in FIG. 5, the lens group may include:

a planar reflector 03 and a curved reflector 04, where a light beam diffused by the first diffusing screen 201 and the second diffusing screen 202 is incident onto a reflection surface of the planar reflector 03, is incident onto a reflection surface of the curved reflector 04 through reflection of the planar reflector 03, and is guided to a projection area through reflection of the curved reflector 04.

In addition to a reflection function, the curved reflector 04 has an imaging and amplification function.

Certainly, in some other embodiments of the present disclosure, the lens group may be of another type. For example, the lens group includes only one curved reflector 04, or includes a curved reflector 04 and a lens. In addition, a quantity of reflectors is not limited to two.

In this embodiment of the present disclosure, at least two finally formed projected images all may be 2D images, may be partially 2D images and partially 3D images, or all may be 3D images.

For example, the display apparatus may be used in a vehicle. For example, the vehicle includes a vehicle body, a windshield 05 disposed on the vehicle body, and the foregoing display apparatus. A light beam emitted from the display apparatus is incident onto a front windshield 05 of the vehicle to form a first projected image V1 and a second projected image V2.

The first projected image V1 may be used to display vehicle status information of the vehicle, and the second projected image V2 may be used to display road condition indication information. In this way, the foregoing display apparatus may be disposed to map a plurality of types of important information to space in front of the windshield and display different information on different virtual image planes, so that a driver can clearly view the important information without having to lower the head, thereby improving safety performance of the vehicle.

Figure 6:
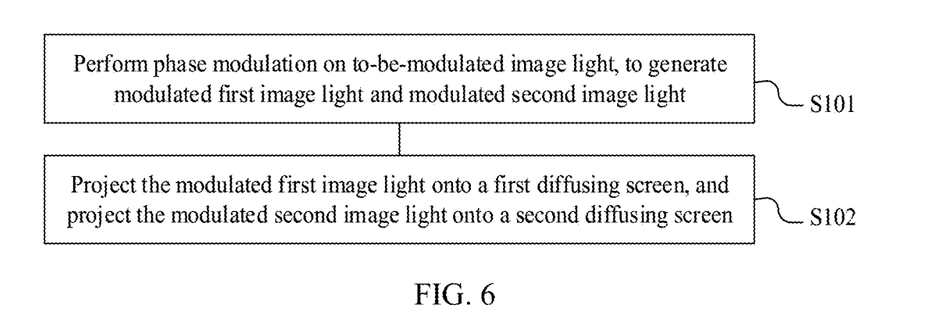
FIG. 6 is a flowchart of an image display method according to an embodiment of the present disclosure.

An embodiment of the present disclosure further provides an image display method, and the image display method is applied to the foregoing image display apparatus. As shown in FIG. 6, the image display method includes the following steps:

S101: Perform phase modulation on to-be-modulated image light, to generate modulated first image light and modulated second image light.

The performing phase modulation on to-be-modulated image light includes loading different phase information into the to-be-modulated image light based on an area, or loading gratings with different structures into the to-be-modulated image light based on an area.

S102: Project the modulated first image light onto a first diffusing screen, and project the modulated second image light onto a second diffusing screen.

A spatial position of the first diffusing screen is different from a spatial position of the second diffusing screen.

The projecting the first image light onto a first diffusing screen, and projecting the second image light onto a second diffusing screen includes controlling transmission areas and white areas of the first diffusing screen and the second diffusing screen, so that the first image light is projected onto the white area of the first diffusing screen, and the second image light is projected onto the white area of the second diffusing screen after passing through the transmission area of the first diffusing screen, where the first diffusing screen and the second diffusing screen are stacked.

Figure 7:
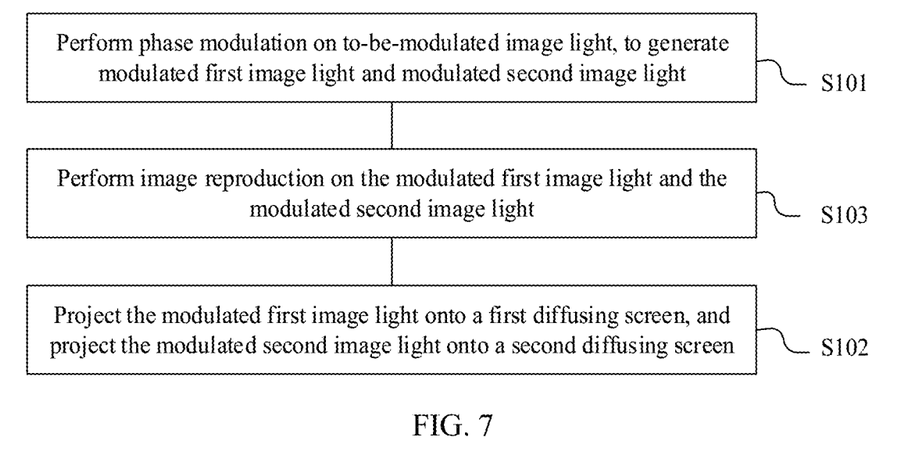
FIG. 7 is a flowchart of another image display method according to an embodiment of the present disclosure.

In an implementation of the present disclosure, as shown in FIG. 7, before step S102 of projecting the modulated first image light onto the first diffusing screen, and projecting the modulated second image light onto the second diffusing screen, the method further includes the following step.

S103: Perform image reproduction on the modulated first image light and the modulated second image light.

An imaging element may be used to perform image reproduction on the modulated first image light and the modulated second image light. The imaging element may be a Fourier lens.

Figure 8:
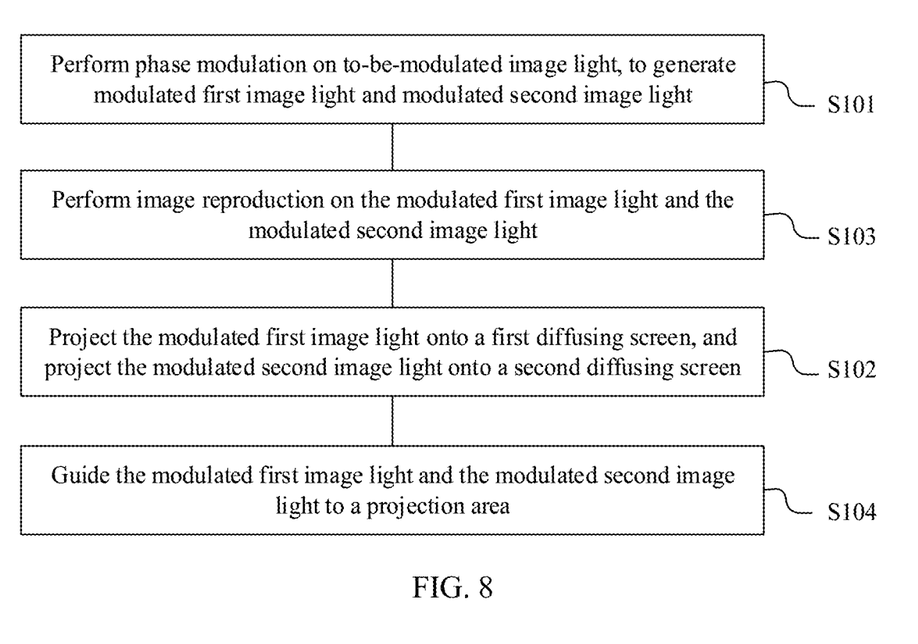
FIG. 8 is a flowchart of another image display method according to an embodiment of the present disclosure.

In an implementation of the present disclosure, as shown in FIG. 8, after step S102, the method further includes the following step.

S104: Guide the modulated first image light and the modulated second image light to a projection area.

A lens group may be used to guide the modulated first image light and the modulated second image light to the projection area, to form a first projected image and a second projected image with different spatial positions.

For example, the first image light is guided to the projection area through a first optical path, and the second image light is guided to the projection area through a second optical path. A length of the first optical path is different from a length of the second optical path. In this way, the lengths of the optical paths of the first image light and the second image light may be adjusted to change imaging positions in space that are of the first image light and the second image light, thereby avoiding overlapping and mutual interference between finally obtained projected images.

The foregoing descriptions are merely specific implementations of the present disclosure, but are not intended to limit the protection scope of the present disclosure. Any variation or replacement within the technical scope disclosed in the present disclosure shall fall within the protection scope of this application. Therefore, the protection scope of this application shall be subject to the protection scope of the claims.

What is claimed is:

1. A display apparatus comprising:
    an image generator comprising:
        a light source;
        a spatial light modulator configured to perform phase modulation on to-be-modulated image light to generate modulated first image light and modulated second image light;
        an image panel is located between a light emitting surface of the light source and an incident surface of the spatial light modulator, wherein the image panel comprises a first display area and a second display area, and wherein the light source is configured to emit a light beam that passes through the first display area and the second display area to generate the to-be-modulated image light; and
    an image displayer disposed on a light-emitting side of the image generator, wherein the image displayer comprising:
        a first diffusing screen at a first spatial position and configured to receive a first projection of the modulated first image light; and
        a second diffusing screen at a second spatial position and configured to receive a second projection of the modulated second image light.

2. The display apparatus according to claim 1, wherein the image displayer further comprises an optical controller configured to control transmission areas and white areas of the first diffusing screen and the second diffusing screen.

3. The display apparatus according to claim 2, wherein the first diffusing screen and the second diffusing screen are stacked so that the modulated first image light is projected onto a first white area of the first diffusing screen, and the modulated second image light is projected onto a second white area of the second diffusing screen after passing through a transmission area of the first diffusing screen.

4. The display apparatus according to claim 1, wherein the incident surface comprises a firsts area opposite to the first display area and a second area opposite to the second display area, and wherein the light beam passing through the first display area is incident onto the first area, and the light beam passing through the second display area is incident onto the second area.

5. The display apparatus according to claim 4, wherein the spatial light modulator comprises a first phase modulator and a second phase modulator, wherein the first phase modulator is configured to load first phase information into a first image light that passes through the first area, wherein the second phase modulator is configured to load second phase information into a second image light that passes through the second area, and wherein the spatial light modulator is configured to perform phase modulation on the first image light in the first area and the second image light in the second area.

6. The display apparatus according to claim 4, wherein the spatial light modulator comprises a first grating modulator corresponding to the first area and a second grating modulator corresponding to the second area, and wherein a grating structure of the first grating modulator is different from a grating structure of the second grating modulator.

7. The display apparatus according to claim 1, wherein the image generator further comprises an imaging element disposed on a second light-emitting side of the spatial light modulator, and wherein the imaging element is configured to:
    perform image reproduction on the modulated first image light and the modulated second image light after being modulated by the spatial light modulator;
    project the modulated first image light onto the first diffusing screen; and
    project the modulated second image light onto the second diffusing screen.

8. The display apparatus according to claim 1, further comprising a lens group configured to guide the modulated first image light and the modulated second image light to a projection area to form a first projected image and a second projected image with different spatial positions.

9. The display apparatus according to claim 8, wherein the modulated first image light is guided to the projection area through a first optical path, wherein the modulated second image light is guided to the projection area through a second optical path, and wherein a first length of the first optical path is different from a second length of the second optical path.

10. The display apparatus according to claim 5, wherein the image displayer further comprises a processor connected to the spatial light modulator and configured to superimpose and compound the first phase information of the first image light loaded by the first phase modulator and the second phase information of the second image light loaded by the second phase modulator to generate the modulated first image light and the modulated second image light.

11. An image display method implemented by a display apparatus, wherein the image display method comprises:
    emitting a light beam that passes through a first display area and a second display area of an image panel to generate a first to-be-modulated image light and a second to-be-modulated image light;
    performing phase modulation on the first to-be-modulated image light and the second to-be-modulated image light to generate a modulated first image light and a modulated second image light;
    projecting the modulated first image light onto a first diffusing screen; and
    projecting the modulated second image light onto a second diffusing screen, wherein a first spatial position of the first diffusing screen is different from a second spatial position of the second diffusing screen.

12. The image display method according to claim 11, wherein projecting the modulated first image light onto the first diffusing screen and projecting the modulated second image light onto the second diffusing screen comprises controlling transmission areas and white areas of the first diffusing screen and the second diffusing screen so that the modulated first image light is projected onto the a first white area of the first diffusing screen, and the modulated second image light is projected onto a second white area of the second diffusing screen after passing through the transmission area of the first diffusing screen, and wherein the first diffusing screen and the second diffusing screen are stacked.

13. The image display method according to claim 11, wherein performing phase modulation on the first to-be-modulated image light and the second to-be-modulated image light comprises:
   loading different phase information into the first to-be-modulated image light and the second to-be-modulated image light; or
   loading gratings with different structures into the to-be-modulated image light.

14. The image display method according to claim 11, wherein prior to projecting the modulated first image light onto the first diffusing screen and projecting the modulated second image light onto the second diffusing screen, the image display method further comprises performing image reproduction on the modulated first image light and the modulated second image light.

15. The image display method according to claim 11, further comprising guiding the modulated first image light and the modulated second image light to a projection area to form a first projected image and a second projected image with different spatial positions.

16. The image display method according to claim 11, wherein performing phase modulation on the first to-be-modulated image light and the second to-be-modulated image light comprises further comprises loading composite kinoforms of different target images based on time.

17. A vehicle comprising:
   a vehicle body;
   a windshield disposed on the vehicle body; and
   a display apparatus configured to emit a light beam onto the windshield of the vehicle to form a first projected image and a second projected image, and wherein the display apparatus comprises:
   an image generator comprising:
      a light source;
      a spatial light modulator configured to perform phase modulation on to-be-modulated image light to generate modulated first image light and modulated second image light;
      an image panel is located between a light emitting surface of the light source and an incident surface of the spatial light modulator, wherein the image panel comprises a first display area and a second display area, and wherein the light source is configured to emit a light beam that passes through the first display area and the second display area to generate the to-be-modulated image light; and
   an image displayer disposed on a light-emitting side of the spatial light modulator, wherein the image displayer comprises:
      a first diffusing screen at a first spatial position configured to receive a projection of the modulated first image light; and
      a second diffusing screen at a second spatial position and configured to receive a projection of the modulated second image light.

18. The vehicle according to claim 17, wherein the image displayer further comprises an optical controller configured to control transmission areas and white areas of the first diffusing screen and the second diffusing screen.

19. The vehicle according to claim 18, wherein the first diffusing screen and the second diffusing screen are stacked so that the modulated first image light is projected onto a first white area of the first diffusing screen, and the modulated second image light is projected onto a second white area of the second diffusing screen after passing through a transmission area of the first diffusing screen.

20. The vehicle according to claim 17, wherein the first projected image displays vehicle status information of the vehicle, and the second projected image displays road condition indication information.

\* \* \* \* \*